United States Patent Office 2,963,446
Patented Dec. 6, 1960

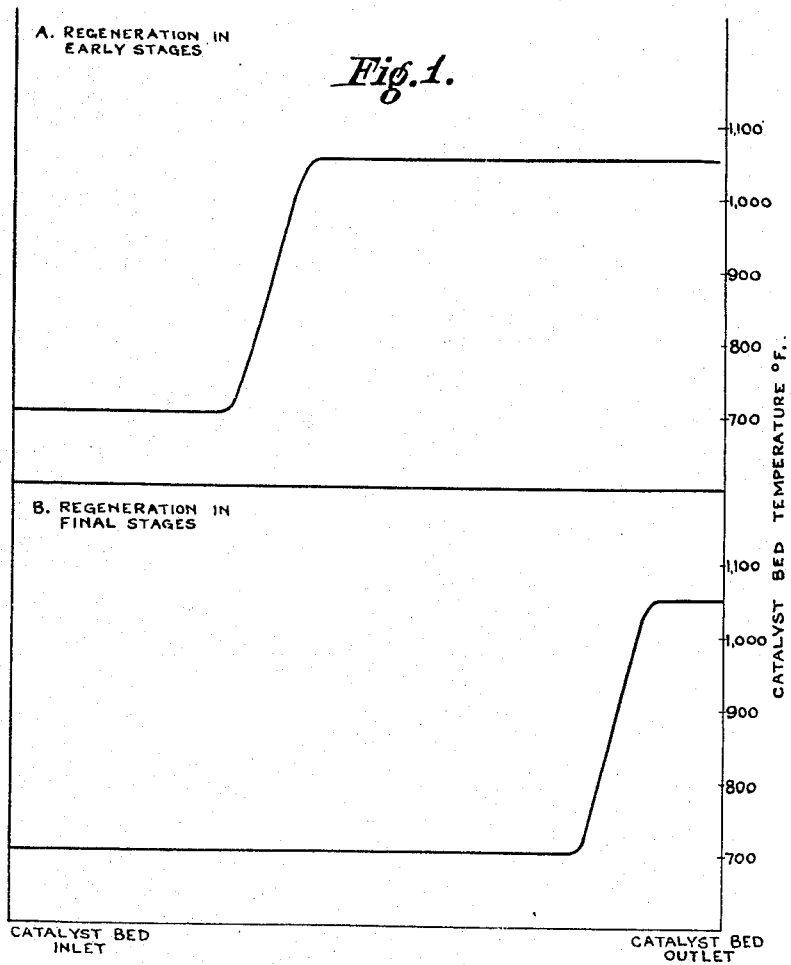

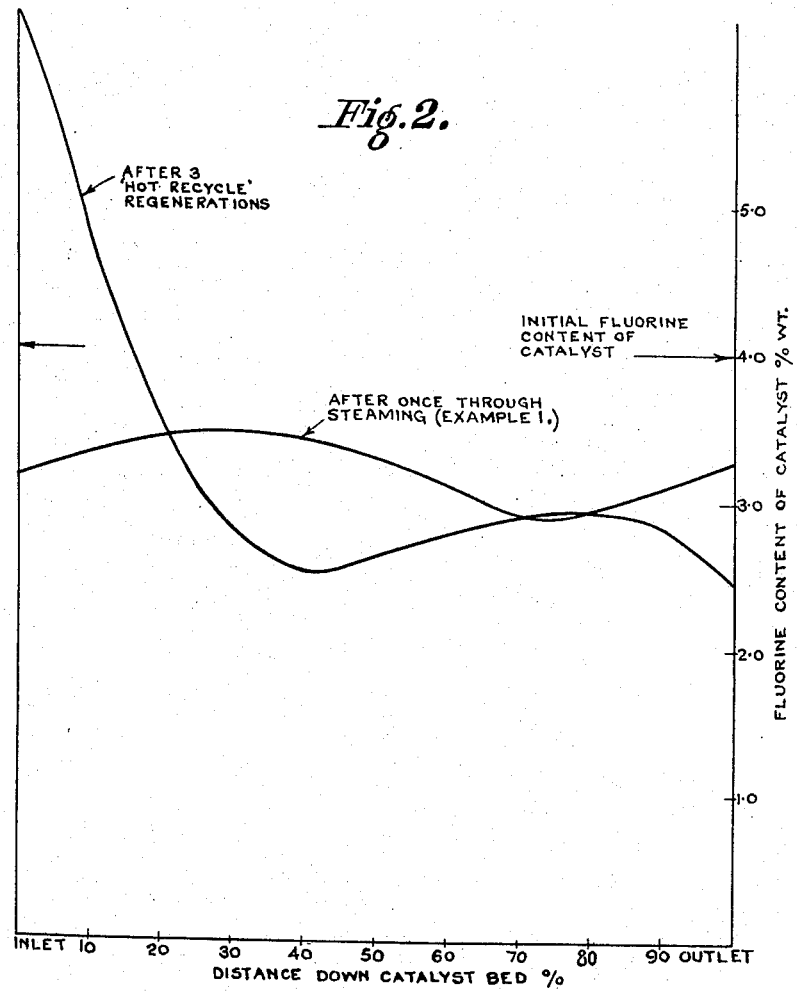

2,963,446

REDISTRIBUTION OF FLUORINE IN A HYDRO-DESULPHURIZATION CATALYST

Frederick William Bertram Porter, Roy Turner, and Ernest Carlton Housam, Sunbury-on-Thames, England, assignors to The British Petroleum Company, Limited, London, England, a British joint-stock corporation Filed June 23, 1955, Ser. No. 517,458

Claims priority, application Great Britain June 24, 1954

4 Claims. (Cl. 252—420)

This invention relates to the hydrocatalytic desulphurization of petroleum feedstocks by means of the autofining process in which the feedstocks are contacted with a sulphur-resistant dehydrogenating-hydrogenation catalyst at elevated temperature and pressure such that sufficient hydrogen is produced by dehydrogenation of naphthenes contained in the feedstock to convert organically combined sulphur into hydrogen sulphide and to maintain an adequate hydrogen recycle without otherwise substantially changing the properties of the feedstock. The autofining process is described inter alia in British patent specifications Nos. 654,152, 669,536 and 669,553.

The preferred catalyst for the operation of the autofining process consists of the oxides of cobalt and molybdenum supported on alumina, and it was discovered that the dehydrogenating activity of this catalyst may be increased considerably by the incorporation in the catalyst of a controlled amount of fluorine varying between 1 and 6% by weight, and the preparation and use of such a fluorine-promoted catalyst is described in British patent specification No. 719,627. The use of the fluorine-promoted catalyst does not increase the degree of desulphurization obtainable at a fixed pressure so that such use is not beneficial with feedstocks that can be adequately desulphurized at pressures obtainable with the unpromoted catalyst. In the case of certain feedstocks, however, such as gas oils, the degree of desulphurization is not as great as could be desired when using the unpromoted catalyst, even when operating under the equilibrium pressure method as described in British patent specification No. 697,083, and according to which all the hydrogen-rich gases separated from the treated feedstock are recycled to the reaction zone and the pressure therein allowed to build up to an equilibrium pressure. In these circumstances the use of the fluorine promoted catalyst is extremely beneficial, since it enables a higher equilibrium pressure to be built up, thereby giving increased desulphurization.

The use of the fluorine promoted catalyst, however, gives rise to the further problem that the catalyst loses fluorine during the regeneration period when it is subjected to higher temperatures than in the process period. The fluorine content can be restored to the initial value in various ways, for example by dissolving an organic fluoride in the feedstock, and providing a once through type of regeneration is employed, that is to say the regeneration gases are not recycled, it is possible not only to maintain the desired fluorine content of the catalyst, but also to maintain an even distribution of the fluorine through the catalyst mass. This last factor is important since it has been shown that there is both an upper and a lower limit to the fluorine content for maximum activity, and it would therefore be necessary to rectify any maldistribution of fluorine on the catalyst caused by regeneration. Such maldistribution occurs when the catalyst is subjected to "hot recycle" regeneration, according to which the greater part of the products of combustion are recycled to the reaction zone without the removal of acidic gases, and the principal object of the present invention is to provide a satisfactory method of remedying such maldistribution before the catalyst is reused in the process. It is often desirable, on economic grounds, to be able to use hot recycle regeneration. The process of the invention is however applicable whatever the cause of the maldistribution of the fluorine.

It will be seen from Figure 1 of the accompanying drawings that there is a gradual fall in temperature along the catalyst bed as regeneration proceeds, and that for the greater part of the regeneration period the inlet part of the bed is at a temperature of about 700° F., while a progressively diminishing part of the bed is at a temperature of between 1000 and 1100° F. During hot recycle regeneration it is thought that hydrofluoric acid formed in the burning zone is recycled to the reactor inlet and is redeposited on the cooler part of the catalyst. Whatever the explanation, however, it is an observed fact that the fluorine content of the inlet part of the bed rises to a value considerably above the initial fluorine content of the catalyst before use, as will be seen from Figure 2 of the accompanying drawings with reference to the curve for the fluorine content after three hot recycle regenerations.

It is possible to bring about a redistribution of the fluorine by subjecting the catalyst to contact with steam or steam-containing gas which is passed over the catalyst without recycle at elevated temperature and at a rate and for a time sufficient to redistribute the fluorine on the catalyst to an adequate extent, as described in the specification of the copending Serial No. 517,456, now abandoned. Such process inevitably involves a small overall loss of fluorine and the principal object of the present invention is to minimize such loss.

According to the invention, redistribution of fluorine on a bed of fluorine-promoted cobalt and molybdenum oxide catalyst is effected by passing steam or steam-containing gas over the catalyst at elevated temperature and at a rate and for a time sufficient to redistribute the fluorine to an adequate extent, the outlet of the catalyst bed being maintained at a lower temperature than the inlet of the bed.

Preferably, the inlet temperature of the bed should be within the range 700° F.–1000° F.

The necessary temperature differential between the inlet and outlet end of the catalyst bed may conveniently be brought about by arranging that the temperature of the steam or steam-containing gas as it enters the catalyst bed is higher than that of the catalyst bed, the rate of flow and the duration of the tretament being controlled so that any desired portion of the bed has been heated to the temperature of the steam or steam-containing gas while the remainder of the bed is at its initial temperature. For example, the initial temperature of the catalyst may be about 700° F. and the temperature of the steam or steam-containing gas 850° F., the rate of flow and the duration of the treatment being so selected that at the end of the treatment the inlet half of the catalyst bed has been heated to 850° F. by the sensible heat of the inlet gases, while the temperature of the exit half of the bed has remained substantially at 700° F.

By this means it is believed that fluorine is removed from the inlet end of the bed and is redeposited to a certain extent lower down the bed as the ratio of fluorine in the gas phase to fluorine on the catalyst becomes more favorable for fluorine deposition, but whatever the explanation it is an observed fact that the distribution of the fluorine throughout the catalyst bed is much improved.

The invention will now be described with reference to the following examples.

Example 1

A catalyst which had been regenerated three times by the hot recycle method was subjected to steaming under the following conditions:

| | |
|---|---|
| Temperature | 850° F. at the inlet falling to 700° F. at the outlet. |
| Pressure | Atmospheric (100% steam). |
| Space velocity | 60 v./v./hr. |
| Duration | 2 hours. |

The fluorine content of the catalyst before and after steaming was as follows:

| | Catalyst charged, percent wt. F. | After steaming, percent wt. F. |
|---|---|---|
| Zone 1 (Inlet) | 5.0 | 3.3 |
| Zone 2 | 2.9 | 3.4 |
| Zone 3 | 3.3 | 2.9 |
| Zone 4 (Outlet) | 2.9 | 3.1 |

Overall loss: 0.06% wt. fluorine.

The improved fluorine distribution is apparent from a consideration of Figure 2.

Example 2

In this case, the product gas from an inert gas generator was used in place of steam.

The catalyst of Example 1 was treated with the product gas under the following conditions:

| | |
|---|---|
| Temperature | 850° F. at the inlet falling to 700° F. at the outlet. |
| Total pressure | 50 p.s.i.g. |
| Steam partial pressure | 22 p.s.i.g. |
| Space velocity | 50 v./v./hr. |
| Duration | 10 hours. |

The fluorine content of the catalyst before and after the treatment was as follows:

| | Catalyst charged, percent wt. F. | After steaming, percent wt. F. |
|---|---|---|
| Zone 1 (Inlet) | 5.0 | 3.2 |
| Zone 2 | 4.5 | 4.0 |
| Zone 3 | 3.8 | 4.2 |
| Zone 4 | 3.3 | 3.7 |
| Zone 5 | 3.1 | 3.4 |
| Zone 6 (Outlet) | 2.9 | 3.2 |

We claim:

1. The method of treating a regenerated catalyst mass consisting essentially of oxides of cobalt and molybdenum on alumina and containing from 1 to 6% fluorine which has been maldistributed in the catalyst mass by the regeneration thereof to more substantially uniformly distribute the fluorine throughout the catalyst mass which comprises maintaining said catalyst mass at a temperature between 700 to 1000° F., maintaining the inlet end of said catalyst mass at a higher temperature within said temperature range than the outlet end thereof, and passing a gas selected from the group consisting of steam and steam-containing product gas from an inert gas generator over said catalyst mass from the hotter inlet end to the colder outlet end for a period of time of at least 2 hours, whereby said fluorine is more uniformly distributed throughout the catalyst mass.

2. The method in accordance with claim 1 wherein said gas is steam.

3. The method of treating a regenerated catalyst mass consisting essentially of oxides of cobalt and molybdenum on alumina and containing from 1 to 6% fluorine which has been maldistributed in the catalyst mass by the regeneration thereof to more substantially uniformly distribute the fluorine throughout the catalyst mass which comprises establishing a temperature of at least 700° F. but less than 1000° F. uniformly throughout said catalyst mass, passing a gas selected from the group consisting of steam and steam-containing product gas from an inert gas generator over said catalyst mass at a temperature in excess of the temperature selected for said catalyst mass whereby the inlet end of said catalyst mass is maintained at a temperature above the selected temperature of said catalyst mass but not in excess of 1000° F. with the exit end of said catalyst mass being maintained at a temperature lower than that of said inlet end but not below 700° F., and continuing the passage of said gas over said catalyst mass from the inlet end to the outlet end thereof for a period of time of at least 2 hours, whereby said fluorine is more uniformly distributed throughout the catalyst mass.

4. The method in accordance with claim 3 wherein said gas is steam.

References Cited in the file of this patent

UNITED STATES PATENTS

| | | |
|---|---|---|
| 2,479,885 | West | Aug. 23, 1949 |
| 2,642,383 | Berger | June 16, 1953 |
| 2,646,388 | Crawford | July 21, 1953 |
| 2,668,798 | Plank | Feb. 9, 1954 |
| 2,755,231 | Blanding et al. | July 17, 1956 |

FOREIGN PATENTS

| | | |
|---|---|---|
| 719,627 | Great Britain | Dec. 8, 1954 |